Nov. 14, 1939.  G. ALGARSSON  2,179,775
PRESSURE GOVERNED CONTROL DEVICE
Filed Aug. 25, 1937  2 Sheets-Sheet 2

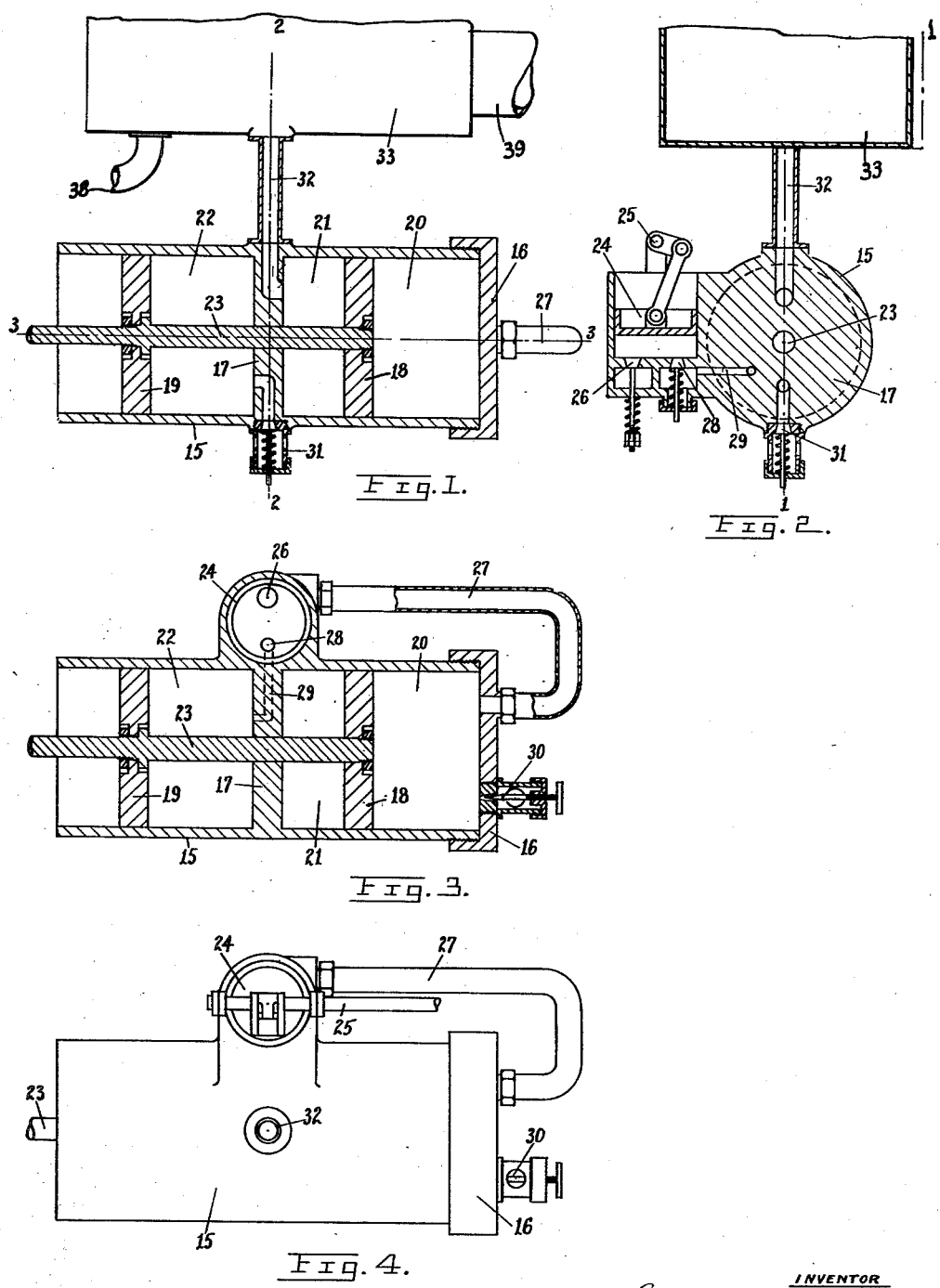

INVENTOR
GRETTIR ALGARSSON
By
ATTORNEY

Patented Nov. 14, 1939

2,179,775

UNITED STATES PATENT OFFICE 2,179,775

PRESSURE GOVERNED CONTROL DEVICE

Grettir Algarsson, Montreal, Quebec, Canada

Application August 25, 1937, Serial No. 160,894

9 Claims. (Cl. 60—62.6)

This invention relates to pressure governed control devices as described in the present specification and illustrated in the accompanying drawings that form part of the same.

The invention consists essentially in the means whereby any variation of the governing pressure immediately causes a displacement in the device whereby valves or other such like devices are operated, as pointed out in the claims for novelty following a description in detail of one form of the invention.

The objects of the invention are to provide a control actuated by the absolute pressure in pressure systems regardless of variations in pressure of the surrounding gas or atmosphere, and to carry out such control with a minimum expenditure of power.

A further object is to provide a control which will be fully automatic and sensitive in the slightest variations of governing pressure.

A further object of the invention is to provide a control which will exert sufficient effort through a great enough travel to operate having mechanism without the use of relays.

In the drawings Figure 1 is a vertical section of the control device on the line 1—1 of Figure 2, showing the intermediate or control chamber connected to a pressure system.

Figure 2 is a vertical cross section on the line 2—2 of Figure 1, showing the connections of the pump with the control device.

Figure 3 is a longitudinal section on the line 3—3 of Figure 1, showing the connections between the various chambers.

Figure 4 is a plan view of the device.

Figure 5:
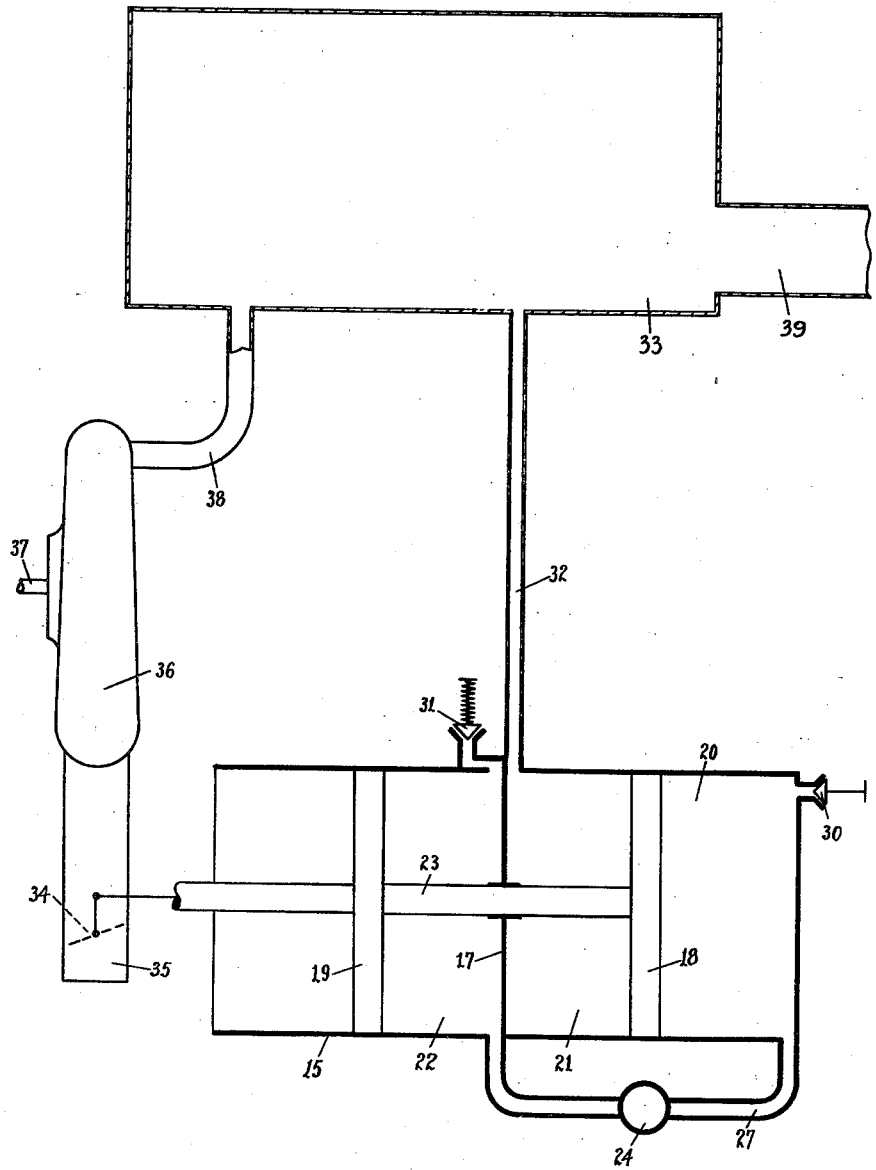
Figure 5 is a diagrammatic illustration showing the device applied to maintain the absolute pressure in an aircraft cabin at a selected value.

Referring to the drawings, the cylinder 15 is provided with a head 16 closing one end, and has an intermediate bulkhead 17. The end of the cylinder 15 opposite to that having the head 16, is left open to the surrounding gas or atmosphere.

Pistons 18 and 19 are fitted to reciprocate in the cylinder 15, one on either side of the bulkhead 17, thereby dividing the cylinder into three chambers 20, 21 and 22, all of which are expansible. A piston rod 23, passes through the bulkhead 17 to connect the two pistons 18 and 19 whereby they are constrained to move with each other. This piston rod 23 projects beyond the cylinder to make suitable connections with the device or apparatus to be controlled.

The device to be controlled forms no part of this invention and is not shown.

An air pump 24 of suitable type and capacity is mounted on the cylinder 15 in any suitable position. This air pump 24 is constantly driven by means of the shaft 25 from any convenient source of power.

The spring loaded inlet valve 26 of the air pump, has a pipe connection 27 with the chamber 20 of the control device, while the outlet valve 28 of the air pump is connected through the surface 29 with the chamber 22. An adjustable inlet leak valve 30 permits the entrance of air to the chamber 20 and thence to the air pump 24. A spring loaded relief valve 31 is provided for the chamber 22 thereby completing the circuit of air through the device.

The chamber 21 has a pipe connection 32 leading to a supply tank 33 which is directly connected, by means of the pipe connection 39, with a source of governing pressure, not shown. The medium transmitting the pressure may be of any nature, such as gas, air or steam.

A specific application of the invention which is not to be taken as in any way limiting its scope, and is here described as applied to an air compressor unit whose function is to maintain a constant absolute pressure of say 15 lbs./sq. in., in the cabin of an aircraft, regardless of the altitude at which the aircraft is flying. In this application of the invention the piston rod 23 engages with the throttle valve 34 in the intake pipe 35 of the air compressor 36. This compressor 36 is driven from any suitable source of power, by the shaft 37 and is directly connected by the pipe line 38 with the reservoir 33 feeding the cabin of the aircraft, not shown, through the connecting pipe 39. The reservoir 33 is the source of governing pressure connected to the chamber 21 of the device by the pipe connection 32.

In the operation of the invention, the moment that the air compressor 36 is started the airpump 24 commences to draw air from chamber 20 and force it into the chamber 22. This continues until the pressure in the chamber 22 is 14 lbs./sq. in., above that of the surrounding atmosphere, at which value the pressure will remain constant, any excess escaping through the relief valve 31.

The air inlet leak valve 30 is now adjusted till the pressure in the chamber 20 remains constant at about 1 lb./sq. in., absolute.

Noting that the chamber 21 is connected to the cabin of the aircraft, the operation of the control may be clearly foreseen. There will be a constant net pressure of 14 lbs./sq. in., exerted upon piston 19 tending to move it, and consequently the piston rod 23 and piston 18, in an outward direction, i. e., tending to open the throttle valve 34 of the air compressor 36. The piston 18 will be subjected to the absolute pressure in the supply tank 33 and the cabin of the aircraft less the 1 lb./sq. in., in the chamber 20. This pressure will be exerted in the inward direction, i. e., tending to close the throttle.

Evidently, if the absolute pressure in the cabin, and, therefore, in chamber 21, is 15 lbs./sq. in., the net pressure on piston 18 will be 14 lbs./sq. in., and will exactly balance the opposing pressure on piston 19.

If, however, the absolute pressure in the cabin is greater than 15 lbs./sq. in., the net pressure on the piston 18 will exceed the opposing pressure on the piston 19 and the piston rod, carrying both pistons will move inwards gradually closing the throttle of the air compressor until either the pressure in the cabin falls to 15 lbs./sq. in., or the throttle is closed. If the pressure in the cabin falls below 15 lbs./sq. in., absolute, the net pressure on the piston 18 will fall below 14 lbs./sq. in., and the piston rod will move outwards opening the throttle until the cabin pressure is restored, when the control will again be in equilibrium and movement of the throttle ceases.

Note that all outward movements of the piston will be gradual, as the air pump is of quite small capacity, running at low R. P. M. and receiving air at low pressure from the chamber 20. This prevents hunting of the control.

If required, inward movements of the pistons can also be made gradual by fitting a relief of small capacity, thus limiting the rate of escape of air from the chamber 22.

It will be understood that variations in speed of the air compressor and, consequently, of the air pump will not affect the operation of the control so long as the air pump is of sufficient capacity, when running at low speed, to overcome whatever leakage may exist in the system and gradually make good outward movements of piston 19.

While this device has been described as using gas or air as the operating medium, it will readily be understood that any other fluid could also be used either as the governing medium or the balancing medium.

What I claim is:—

1. In a controlled mechanism, a pressure governed control device comprising a series of balancing chambers having movable walls connected for synchronous movement to effect control, one chamber having a restricted inlet, a second chamber having a controlled outlet, a third chamber having a connection to a source of governing pressure whose variation will cause displacement of the movable walls, and a constantly driven pump having an inlet connection from the first chamber and an outlet connection to the second chamber, said pump adapted to maintain a balance between the first two chambers and the third when the governing pressure is at the desired absolute value, control of the mechanism being effected by movement of said walls under variation of the governing pressure.

2. In a controlled mechanism, a source of governing pressure, a pressure governed control device comprising a chamber subject to said governing pressure, a second chamber subject to a set pressure opposing said governing pressure, a pump maintaining the set pressure in the second chamber at a constant datum above the pressure of the surrounding gas or atmosphere, and a third chamber serving as a source of supply for said pump and constrained to a low absolute pressure in opposition to the governing pressure in the first chamber, each of said chambers having a moveable wall permitting change of capacity, said walls being connected together for synchronous movement under variation of the governing pressure to operate said controlled mechanism.

3. In a controlled mechanism, a source of governing pressure, a pressure governed control device comprising a chamber subject to said governing pressure, a second chamber subject to a set pressure opposing said governing pressure, a pump adapted to maintain the set pressure in the second chamber at a constant datum above the surrounding gas or atmosphere, and a third chamber serving as a source of supply for said pump and constrained to a low absolute pressure in opposition to the governing pressure in the first chamber, each of said chambers having a moveable wall permitting change of capacity, said walls being connected together for synchronous movement under variation of the governing pressure to operate said controlled mechanism.

4. In a controlled mechanism, a source of governing pressure, a pressure governed control device comprising a chamber subject to said governing pressure, a second chamber subject to a set pressure opposing said governing pressure, a constantly driven pump adapted to maintain the set pressure in the second chamber at a constant datum above the surrounding gas or atmosphere, and a third chamber serving as a source of supply for said pump and constrained to a low absolute pressure in opposition to the governing pressure in the first chamber, each of said chambers having a moveable wall permitting change of capacity, said walls being connected together for synchronous movement under variation of the governing pressure to operate said controlled mechanism.

5. In a controlled mechanism, a source of governing pressure, a pressure governed control device comprising a chamber subject to said governing pressure, a second chamber having a relief valve to constrain the pressure in said chamber to a constant datum above the pressure of the surrounding gas or atmosphere, a pump adapted to maintain said constant pressure in the second chamber, and a third chamber serving as a source of supply for said pump and constrained to a low absolute pressure in opposition to the governing pressure in the first chamber, each of said chambers having a moveable wall permitting change of capacity, said walls being connected together for synchronous movement under variation of the governing pressure to operate said controlled mechanism.

6. In a controlled mechanism, a source of governing pressure, a pressure governed control device comprising a chamber subject to said governing pressure, a second chamber, an adjustable relief valve constraining the pressure in said second chamber to a selectable constant datum above the pressure of the surrounding gas or atmosphere, a pump adapted to maintain said constant pressure in the second chamber, and a third chamber serving as a source of supply for said pump and constrained to a low absolute pressure in opposition to the governing pressure in the first chamber, each of said chambers having a moveable wall permitting change of capacity, said walls being connected together for synchronous movement under variation of the governing pressure to operate said controlled mechanism.

7. In a controlled mechanism, a source of governing pressure, a pressure governed control device comprising a chamber subject to said governing pressure, a second chamber, an adjustable relief valve constraining the pressure in said second chamber to a selectable constant datum above the pressure of the surrounding gas or atmosphere, a pump adapted to maintain said constant pressure in the second chamber, a third chamber serving as a source of supply for said pump, and an adjustable inlet valve to said third chamber constraining the pressure therein to a low absolute value in opposition to the governing pressure in the first chamber, each of said chambers having a moveable wall permitting change of capacity, said walls being connected together for synchronous movement under variation of the governing pressure to operate said controlled mechanism.

8. In a controlled mechanism, a source of governing pressure, a pressure governed control device comprising a cylinder having an inner closed compartment and an outer compartment open to the atmosphere, a piston fitted in each of said compartments to divide the cylinder into a series of three expansible chambers, the intermediate of said chambers being connected to the source of governing pressure, a piston rod connecting the two pistons, said piston rod extending beyond the cylinder to form a control medium, a constantly driven pump having an inlet connection from one end an outlet connection to the other of the two outer chambers to maintain the pressure in the latter at a constant datum above the surrounding gas or atmosphere and constraining the former to a low value of absolute pressure in opposition to the governing pressure in the intermediate chamber, said device adapted on movement of the piston rod under variation of the governing pressure to operate said controlled mechanism.

9. In a controlled mechanism, a source of governing pressure, a pressure governed control device comprising a cylinder having an inner closed compartment and an outer compartment open to the atmosphere, a piston fitted in each of said compartments to divide the cylinder into a series of three expansible chambers, one end chamber having an adjustable inlet valve and the other end chamber having an adjustable relief valve, a connection from the intermediate of said chambers leading to the source of governing pressure, a piston rod connecting the two pistons, said piston rod extending beyond the cylinder to form a control medium, a constantly driven pump having an inlet connection with the first of said chambers adapted to maintain said chamber at a low value of the absolute pressure in opposition to the governing pressure in the intermediate chamber, and an outlet connection from said pump to the other end chamber whereby the pump maintains the pressure in said chamber at a constant datum above the surrounding gas or atmosphere, said device adapted on movement of the piston rod under variation of the governing pressure to operate said controlled mechanism.

GRETTIR ALGARSSON.